W. S. E. SEVEY.
Bale-Tie.

No. 228,223.  Patented June 1, 1880.

Witnesses.
James C. Kiddell
J. C. Clarke

Inventor
W. S. E. Sevey
By H. N. Jenkins
Attorney.

UNITED STATES PATENT OFFICE.

WILLIAM S. E. SEVEY, OF NEW ORLEANS, LOUISIANA.

BALE-TIE.

SPECIFICATION forming part of Letters Patent No. 228,223, dated June 1, 1880.

Application filed October 6, 1879.

*To all whom it may concern:*

Be it known that I, WILLIAM S. E. SEVEY, a resident of the city of New Orleans, parish of Orleans, and State of Louisiana, have invented a certain new and useful Improvement in Bale-Ties; and I do hereby declare the following to be a full, clear, and correct description of the same, reference being had to the annexed drawings, making a part of this specification.

This invention relates to certain improvements in that class of bale-ties known as "upset" or "turn-over" buckles; and its nature will be fully understood by referring to the accompanying drawings, whereon—

Figure 1:
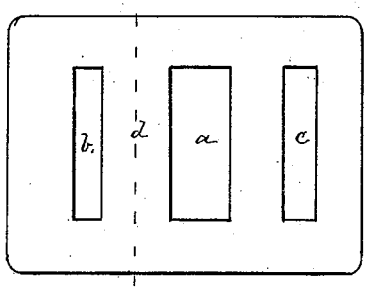
Figure 2:
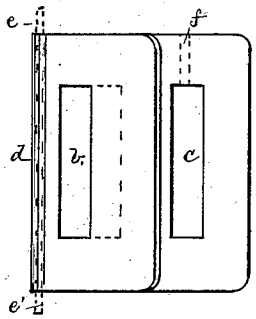
Figure 3:
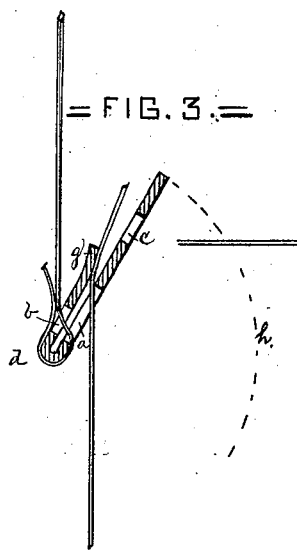

Figure 1 represents the tie-plate as when fresh from the die; Fig. 2, the plate folded and ready for use; Fig. 3, the manner in which the fastening is made, and Fig. 4 the fastening complete.

Figure 4:

My invention consists in a flat rectangular piece of metal, about the center of which is constructed a rectangular opening, $a$, and to each side thereof similarly-shaped, though much narrower, openings $b$ $c$. One end of this plate is folded over the other, the fold being made through the center of the bar $d$, so as to cause one end of the plate to project about half-way over the other, as shown in Figs. 2, 3, and 4.

The dotted lines $e$ $e'$ are intended to show that by inserting a piece of heavy wire in the fold or by otherwise providing the said portion of the plate with side projections it may be adapted for use with almost any tightener.

The manner of using my tie-plate is as follows: One end of a bale-band is first permanently secured to the bar $d$ by passing it through the openings $a$ $b$, and by bending it back around the bar $d$, as shown in Figs. 3 and 4. The opposite end of the band is next passed around the bale in the usual manner. It is then brought up in front thereof and inserted in the wide opening of the plate, the latter being previously thrown up in the position shown in Fig. 3, so that the band shall strike against the solid portion $g$ of the plate and be deflected outward thereby. The band is next pulled, either by hand or machinery, until all the slack therein has been taken up, and the fastening is finally completed by swinging the plate outward in the direction of the dotted lines $h$.

When released from pressure the expansive force of the material of which the bale is composed causes the tie-plates to be pulled downward until the said plates are brought into a direct, or nearly direct, line with the bands.

The opening $c$ provides for the securing of the bands by means of oblate hooks in the ordinary way. This opening can be made with a side slot, as shown in dotted lines at $f$, so as to enable the operator to slip the band sidewise therein.

Having described my invention, what I claim as new, and desire to secure by Letters Patent, is—

1. A bale-tie plate provided with three rectangular openings, $a$ $b$ $c$, said plate folded through one of its bars, as described, and for the purpose set forth.

2. A bale-tie buckle folded substantially in the manner as described, so that the solid material of one end opposite the opening through which the free end of the band is passed shall deflect and secure the free end of the band.

In testimony whereof I have hereunto signed my name.

WM. S. E. SEVEY.

In presence of—
H. N. JENKINS,
P. J. FINNEY,
JAMES C. KIDDELL.